United States Patent [19]

Catanese

[11] Patent Number: 4,825,736
[45] Date of Patent: May 2, 1989

[54] APPARATUS FOR AND METHOD OF MACHINING AROUND AN OPENING IN A WORKPIECE

[75] Inventor: John A. Catanese, Seward, Pa.

[73] Assignee: Westinghouse Electric Corp., Pittsburgh, Pa.

[21] Appl. No.: 95,732

[22] Filed: Sep. 14, 1987

[51] Int. Cl.$^4$ .................... B31B 5/08; B31B 47/34
[52] U.S. Cl. .......................... 82/1.11; 82/48;
  82/50; 82/52; 82/901; 29/DIG. 61; 51/273;
  408/67; 409/137
[58] Field of Search ............. 82/1 C, 34 R, 48, 50,
  82/52, DIG. 2; 29/DIG. 53, DIG. 61, DIG.
  86, DIG. 88, DIG. 93, DIG. 102; 51/273;
  407/11; 408/67, 710; 409/134, 137

[56] References Cited

U.S. PATENT DOCUMENTS

| | | | |
|---|---|---|---|
| 2,033,946 | 3/1936 | Lippincott | 164/69 |
| 2,460,490 | 2/1949 | Cook | 29/DIG. 61 |
| 3,561,299 | 2/1971 | Brisk et al. | 407/11 |
| 3,949,471 | 4/1976 | Cawley | 30/123.3 |
| 4,037,982 | 7/1977 | Clement | 408/67 |
| 4,250,778 | 2/1981 | Christoph | 82/4 |
| 4,296,572 | 10/1981 | Quintana | 51/273 |
| 4,322,992 | 4/1982 | Remillard et al. | 82/34 R |
| 4,340,326 | 7/1982 | Buonauro et al. | 408/67 |
| 4,403,534 | 9/1983 | Altendorf et al. | 83/100 |
| 4,525,955 | 7/1985 | Cothrell et al. | 51/273 |
| 4,589,312 | 5/1986 | Meyers et al. | 82/47 |

FOREIGN PATENT DOCUMENTS

| | | | |
|---|---|---|---|
| 2944491 | 5/1981 | Fed. Rep. of Germany. | |
| 34487 | 3/1977 | Japan | 82/52 |
| 51183 | 4/1977 | Japan | 82/52 |
| 57-163038 | 10/1982 | Japan. | |

Primary Examiner—Frederick R. Schmidt
Assistant Examiner—William E. Terrell

[57] ABSTRACT

Apparatus for and method of clearing scrap from the opening of a workpiece in which a jet of fluid is directed over the opening, causing the scrap to be entrained in fluid streaming out of the opening to join the fluid jet. In a preferred embodiment of the invention, the fluid jet is pulsed in order to maximize its efficiency. In an alternative embodiment, a vacuum is used to collect the entrained scrap.

13 Claims, 2 Drawing Sheets

APPARATUS FOR AND METHOD OF MACHINING AROUND AN OPENING IN A WORKPIECE

BACKGROUND OF THE INVENTION

1. Field of the Invention

This invention pertains to apparatus for and method of machining around the opening of a workpiece, and, specifically, cutting and facing operations around the end of a tubular workpiece.

2. Background Art

Machining operations generally involve the use of a tool to remove material from a workpiece. The material once removed becomes scrap. When the workpiece is hollow, the scrap must be prevented from entering the workpiece as it may be difficult to extract the scrap from the workpiece efficiently or without damaging the workpiece.

As a specific example, two of the final steps in the manufacturing of thimble tubes and fuel tubes for nuclear reactors involve cutting to length and facing tubular stock. These operations are effected using a parting tool and a facing tool, respectively. The tube stock is rotated while the tools are manipulated to perform their assigned functions. Scrap generated by these operations tends to accumulate in the tubes. If it is not removed, it can result in scratches on the inside of the tubes. Scrap removal has been performed in the past manually by a worker with a brush. This approach was obviously extremely labor intensive, making it expensive and inefficient.

There is thus a need for an apparatus for and a method of preventing or inhibiting scrap from entering the tubes, or remove such scrap after it has entered the tube.

SUMMARY OF THE INVENTION

It is therefore an object of the present invention to provide means for and a method of inhibiting scrap from entering and remaining in a workpiece.

It is a further object of the present invention to provide means and method such that the scrap is eliminated efficiently and without damaging the workpiece.

It is a further object to provide such means and method in a fashion which will not interfere with the machining operation, but, instead, will promote machining through a beneficial effect on tool life.

Additional objects, advantages, and novel features of the invention will be set forth in part in the description which follows, and will also in part become apparent to those ordinarily skilled in the art upon examination of the following, or will be readily perceived through practice of the invention.

To achieve the foregoing and other objects in accordance with the purposes of the invention, embodied and broadly described herein, there is provided an apparatus and method in which an airjet is directed over the opening to create a region of low pressure above the opening. This region of low pressure draws pieces of scrap up into the airjet where they are entrained and carried away from the workpiece. In an alternative embodiment of the invention, suction means are additionally provided downstream of the workpiece for receiving the scrap and conveying it away. Also, the airjet may be pulsed to achieve maximum effectiveness at scrap removal for a given volume of air.

BRIEF DESCRIPTION OF THE DRAWINGS

These and other advantages and features of the present invention will be more fully appreciated from the following written description read in conjunction with the drawings, in which.

DETAILED DESCRIPTION OF THE PREFERRED EMBODIMENTS

Reference will now be made in detail to the presently preferred embodiment of the invention, an example of which is illustrated in the accompanying drawings.

To make the description clearer, the structure and operation is described in the context of a specific application, that is, the cutting and facing of a piece of tubular stock. It will be understood, however, that the invention has application in other areas as well, so that the following discussion should not be regarded as limiting in any fashion.

Figure 1:
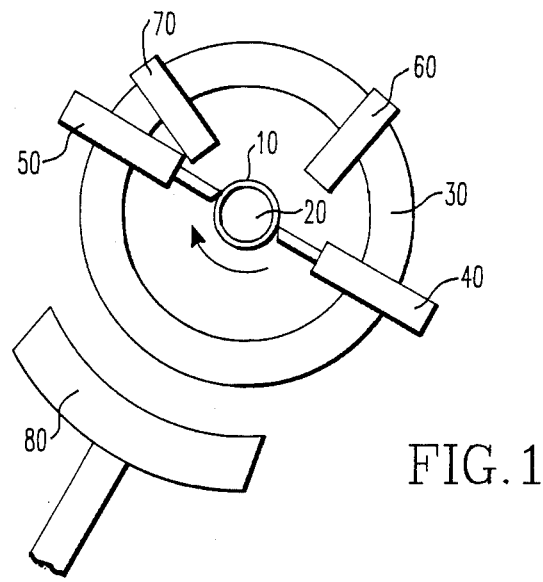
FIG. 1 is a schematic diagram of a preferred embodiment of an apparatus for machining around an opening in a workpiece according to the present invention.

With the foregoing in mind, FIG. 1 shows a sketch looking down on a tubular workpiece 10 through its end opening 20. Workpiece 10 is held by a frame 30 and rotated by an apparatus not shown in the drawing.

While tube 10 is being rotated, a parting tool 40 is advanced to cut the workpiece 10. Subsequently, a facing tool 50 is advanced to face the cut end portion of the workpiece 10. These operations generate scrap which tends to find its way into the interior of workpiece 10. It is desired to extract this scrap or, even better, to inhibit its entrance into the interior of workpiece 10. To accomplish this objective, the embodiment of FIG. 1 includes a first nozzle 60 positioned on frame 30. Nozzle 60 is part of means for jetting fluid past the opening 20. The rest of this means, and its manner of operation, will be described in connection with subsequent figures. The embodiment of FIG. 1 also includes a second nozzle 70. Both nozzles are directed, in a fashion which will be described more fully below, in such a way as to blow chips away from the cutting area.

The embodiment of FIG. 1 also includes a vacuum attachment 80 which suctions the scrap material away from the machining operation.

Figure 2:
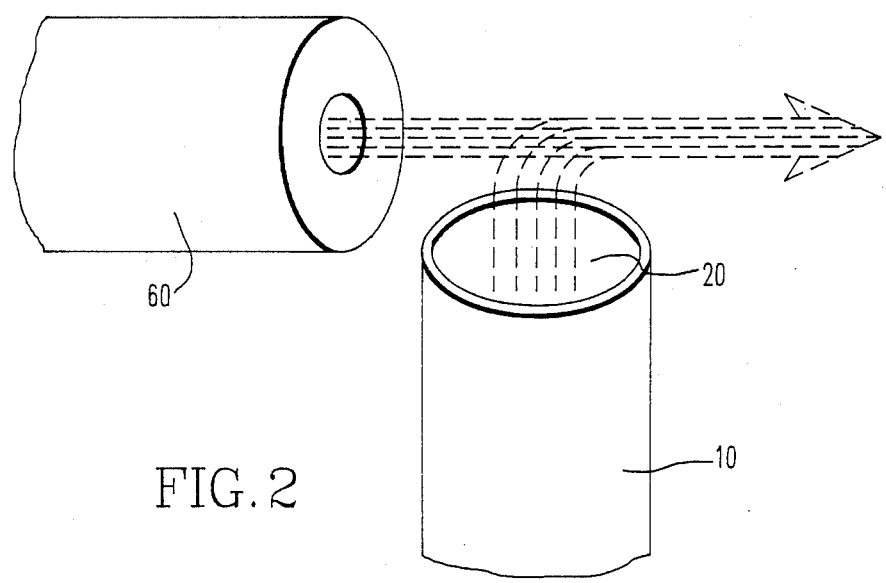
FIG. 2 is an illustration of a preferred arrangement of a nozzle of the system of FIG. 1 with respect to a workpiece.

FIG. 2 shows the preferred arrangement for the location of nozzle 60 with respect to workpiece 10, the remaining elements having been omitted for clarity. As indicated by the arrows, the nozzle 60 is positioned to direct its jet over the top of opening 20. The positioning of the jet from nozzle 60 creates a region of depressed pressure at opening 20. This causes air from nozzle 60 to flow through workpiece 10, through opening 20, and to join the jet. Scrap material in the vicinity of opening 20 which otherwise would fall into workpiece 10 is entrained in the airflow and is directed out of and away from workpiece 10. Once entrained in the jetstream, the scrap is carried to suction attachment 80, which conveys it away from the machining operation. The arrangement of nozzle 70 with respect to workpiece 10 is similar.

Figure 3:
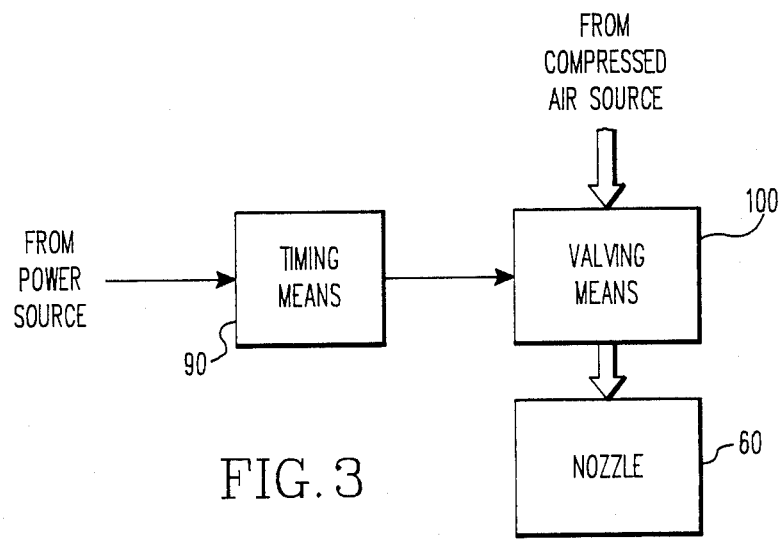
FIG. 3 is a functional block diagram of a preferred air delivery system for the nozzle of FIGS. 1 and 2.

FIG. 3 is a functional block diagram of the other components of a preferred configuration for means for jetting fluid past an opening in accordance with the preferred embodiment of the present invention. In addition to the first nozzle 60, the arrangement includes a timing means 90 and a solenoid valve 100. The timing means controls operation of the solenoid valve, causing the solenoid valve to connect and disconnect the nozzle 60 to and from a source of compressed air.

In a preferred embodiment of the invention, the timing means 90 provides square pulses to the solenoid valve thus causing the jet emitted by nozzle 60 to pulse. The duration and frequency of the pulses is selected to optimize scrap removal. Pulses which occur too frequently or last too long approximate a steady flow condition, which has been found to be inferior to pulsing in effecting scrap removal. On the other hand, pulses which occur too infrequently, or which do not last long enough, do not provide a sufficient volume of air to be effective at scrap removal. In the present invention, it is preferred to use pulses lasting one-tenth of a second at intervals of two-tenths of a second. It has been found that pulses of this type are particularly effective at removing scrap material.

The means for supplying air to nozzle 70 are the same in principle.

Figure 4:
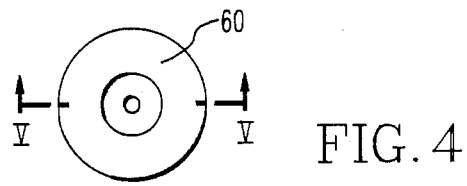
FIG. 4 is an end-on view of a nozzle.
Figure 5:
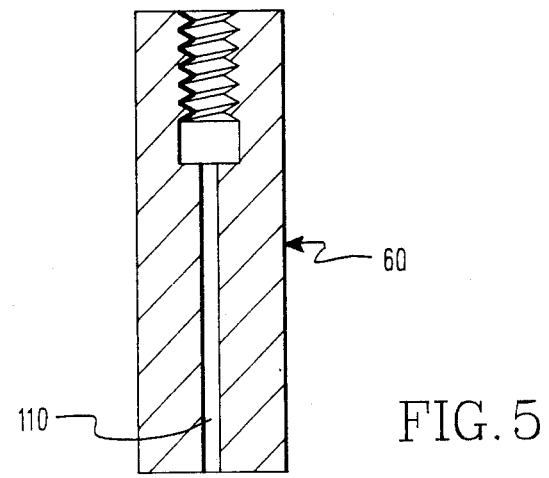
FIG. 5 is a sectional view taken along line V—V of FIG. 4.

FIG. 4 shows an end-on view of a preferred configuration for nozzle 60. As can be seen, nozzle 60 includes a through-bore 110. The through-bore 110 has a stepped diameter, as can be seen most clearly in FIG. 5. The end portion of the widened portion of the diameter is threaded. In the preferred embodiment, it is dimensioned and configured for a ⅛ inch pipe tap and tapped for a ⅛ inch compression fitting. The depth of the widened portion is not crucial; in a preferred embodiment of the invention, it is approximately ¾ inches. The narrower portion of the through-bore then continues for the rest of the length of the nozzle 60. In the preferred embodiment of the invention, the overall length of nozzle 60 is 2½ inches. The diameter of the narrower portion of through-bore 110 in a preferred embodiment of the invention is 1/16 inch. The nozzle 60 is preferably machined of a material such as aluminum. Details of construction of nozzle 70 are similar.

It has been found that a further advantage of an arrangement such as that disclosed is that pressurized air blows against the cutting tools. This cleans the tools. It also cools the tools, resulting in longer tool life.

It will be immediately appreciated by one of ordinary skill in the art that many departures can be made from the embodiments specifically disclosed herein without departing from the teachings of the invention. Therefore, the foregoing examples should be regarded as descriptive rather than limitative. Instead, the invention should be regarded as being fully commensurate in scope with the following claims.

What is claimed is:

1. An apparatus for machining around an opening in a workpiece, comprising:
   means for holding the workpiece;
   means for cutting said workpiece in the vicinity of said opening, said cutting means producing scrap when cutting said workpiece; and
   means positioned adjacent the opening for jetting a fluid past the opening to produce a region of low fluid pressure at said opening to thereby create a flow of fluid out of said opening to prevent said scrap from accumulating in said workpiece.

2. The apparatus claimed in claim 1, wherein said jetting means comprises:
   a nozzle supported by said holding means;
   a valving means, in fluid communication with said nozzle, and adapted to be connected to a source of fluid under pressure, for selectably interconnecting said nozzle with said source of compressed fluid; and
   control means, electrically connected to said valving means, for controlling operation of said valving means.

3. The apparatus claimed in claim 1, further comprising suction means arranged downstream of said jetting means for collecting and conveying the scrap away from the opening.

4. An apparatus for machining around an opening in a workpiece comprising:
   a frame for holding the workpiece;
   a tool supported on the frame for cutting the workpiece around the opening said cutting resulting in the generation of scrap;
   means, connected to the frame, for directing a pulsed jet of air over the opening at a sufficient flow rate to create a region of low pressure over the opening to inhibit entry of said scrap into the opening; and
   suction means arranged adjacent the frame for collecting the scrap and conveying the scrap away from the opening.

5. The apparatus claimed in claim 4, wherein said directing means comprises:
   a nozzle supported on the frame;
   valving means, in fluid communication with said nozzle, and adapted to be connected to a source of fluid under pressure, for selectively interconnecting said nozzle with said source of compressed fluid; and
   control means, electrically connected to said valving means, for controlling operation of said valving means.

6. The apparatus claimed in claim 5, wherein said control means controls said valving means to cyclically interconnect said valving means and said source of compressed fluid.

7. The apparatus claimed in claim 5, wherein said fluid is air.

8. An apparatus for machining around an opening in a workpiece, comprising:
   a frame for holding the workpiece;
   a tool supported on the frame for cutting the workpiece around the opening;
   a nozzle supported on the frame and oriented to direct air passing therethrough in a jet over said opening in said workpiece;
   first means, in fluid communication with said nozzle, said adapted to be connected to a source of compressed air, for selectively interconnecting said nozzle and said source of compressed air in response to a control signal;
   second means, electrically connected to said first means, for supplying said control signal periodically; and
   third means, arranged adjacent said frame, for collecting scrap material entrained in said jet.

9. A method of machining around an opening in a workpiece comprising the steps of:

(a) performing a machining operation on said workpiece in the vicinity of said opening which creates scrap; and (b) directing a jet of fluid past the opening to produce a region of low pressure at the opening to thereby cause fluid to flow through the workpiece and out of the opening and inhibit entry of scrap into the opening.

10. The method claimed in claim 9, wherein said step (b) is performed intermittently.

11. The method claimed in claim 9, wherein said step (b) is performed periodically.

12. The method claimed in claim 9, wherein said step (b) is carried out periodically to produce pulsed jets having a duration of approximately one-tenth of a second every two-tenths of a second.

13. The method claimed in claim 9, further comprising a step performed simultaneously with said step (b) of providing suction to collect said scrap.

* * * * *